United States Patent
Lee et al.

(10) Patent No.: US 10,048,795 B2
(45) Date of Patent: Aug. 14, 2018

(54) DISPLAY DEVICE WITH FINGERPRINT IDENTIFICATION AND TOUCH DETECTION

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 286 days.

(21) Appl. No.: 14/872,364

(22) Filed: Oct. 1, 2015

(65) Prior Publication Data
US 2016/0098140 A1 Apr. 7, 2016

(30) Foreign Application Priority Data
Oct. 3, 2014 (TW) .............................. 103134573 A

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06K 9/0002* (2013.01); *G06F 2203/0338* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2008/0309627 A1* | 12/2008 | Hotelling | .......... | G02F 1/134363 345/173 |
| 2009/0256816 A1* | 10/2009 | Kim | ..................... | G09G 3/3648 345/174 |
| 2010/0013789 A1* | 1/2010 | Chung | .................. | G06F 3/0412 345/174 |
| 2011/0063247 A1* | 3/2011 | Min | ........................ | G06F 3/044 345/174 |
| 2012/0038585 A1* | 2/2012 | Kim | ..................... | G06F 3/0412 345/174 |
| 2012/0133613 A1* | 5/2012 | Chen | ....................... | G06F 3/044 345/174 |
| 2013/0341651 A1* | 12/2013 | Kim | .................... | H01L 31/0232 257/84 |

(Continued)

*Primary Examiner* — Kent W Chang
*Assistant Examiner* — Nathaniel P Brittingham
(74) *Attorney, Agent, or Firm* — Muncy, Geissler, Olds & Lowe, P.C.

(57) ABSTRACT

A display device with fingerprint identification and touch detection includes a first substrate, a second substrate parallel to the first substrate, a display material layer configured between the first substrate and the second substrate, and a thin-film-transistor-and-sensing-electrode layer. The thin-film-transistor-and-sensing-electrode layer is disposed at one surface of the first substrate facing the display material layer. The thin-film-transistor-and-sensing-electrode layer has a plurality of sensing electrodes for performing fingerprint identification sensing and touch sensing at the same time.

14 Claims, 14 Drawing Sheets

(56) References Cited

U.S. PATENT DOCUMENTS

| | | | |
|---|---|---|---|
| 2014/0036189 A1* | 2/2014 | Yi | G02F 1/133512 349/43 |
| 2014/0111474 A1* | 4/2014 | Bytheway | G06F 3/044 345/174 |
| 2014/0256074 A1* | 9/2014 | Kim | G06F 3/0412 438/30 |
| 2014/0313438 A1* | 10/2014 | Jun | G06F 3/0412 349/12 |
| 2015/0062454 A1* | 3/2015 | Hao | G06F 3/044 349/12 |
| 2015/0085215 A1* | 3/2015 | Yoshida | G02F 1/136213 349/39 |
| 2015/0185938 A1* | 7/2015 | Han | G06F 3/0412 345/173 |
| 2015/0212366 A1* | 7/2015 | Lou | G02F 1/133512 349/106 |
| 2016/0035759 A1* | 2/2016 | Kwon | H01L 27/1244 257/40 |
| 2016/0093261 A1* | 3/2016 | Kawamura | G09G 3/3648 345/204 |
| 2016/0093685 A1* | 3/2016 | Kwon | H01L 27/3276 257/40 |
| 2016/0098140 A1* | 4/2016 | Lee | G06F 3/0416 345/173 |
| 2016/0132177 A1* | 5/2016 | Bae | G06K 9/00013 345/174 |
| 2016/0195988 A1* | 7/2016 | Fu | G06F 3/044 345/174 |
| 2016/0252785 A1* | 9/2016 | Kimura | G02F 1/13338 349/12 |
| 2016/0266695 A1* | 9/2016 | Bae | G06F 1/1643 |
| 2016/0363797 A1* | 12/2016 | Kimura | G06F 3/0412 |
| 2017/0154199 A1* | 6/2017 | Li | G06K 9/0002 |

\* cited by examiner

DISPLAY DEVICE WITH FINGERPRINT IDENTIFICATION AND TOUCH DETECTION

BACKGROUND OF THE INVENTION

1. Field of the Invention

The present invention relates to the technical field of display devices and, more particularly, to a display device with fingerprint identification and touch detection.

2. Description of Related Art

Modern consumer electronic apparatuses are typically equipped with touch panels for use as their input devices. According to different sensing manners, the touch panels can be classified into resistive type, capacitive type, acoustic type, optical type and other type.

The conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate of the touch display panel.

On-cell and in-cell touch technology were invented to overcome the drawbacks of traditional touch technology described above. The on-cell technology is to dispose a sensor on the back side of a color filter substrate to form a completed color filter substrate. The in-cell technology is to dispose the sensor within the LCD cell structure. Currently, there are three primary in-cell touch technologies, including resistive, capacitive and optical type.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

On the other hand, biological feature sensing and comparing technologies have been maturely and widely applied in identifying and verifying the identity of a person. Typical biometric identification types include fingerprint, voiceprint, iris, retina identifications, and the like.

For consideration of safe, comfortable, and efficient identification, the fingerprint identification has become the most popular one. The fingerprint identification generally requires a scanning to input a fingerprint or a finger image of a user and store the unique features of the finger image and/or the fingerprint for being further compared with the fingerprint reference data built in a database so as to identify or verify the identity of a person.

The image input types of the fingerprint identification include optical scanning, thermal image sensing, capacitive sensing, and the like. The optical scanning type is difficult to be applied in a mobile electronic device due to its large volume, and the thermal image sensing type is not popular due to its poor accuracy and reliability. Thus, the capacitive sensing type gradually becomes the most important biometric identification technology for the mobile electronic device.

FIG. 1 is a local cross-sectional view of a typical fingerprint sensing region, which illustrates a capacitive fingerprint identification sensor interacting with a fingerprint. As shown in FIG. 1, the fingerprint 13 has the ridges 14 located on sensing elements 11. Namely, the capacitive finger identification sensor has a plurality of sensing elements 11, and the fingerprint 13 presses on a non-conductive protection layer 12. In the prior art, the protection layer 12 has a thickness of about 50 µm to 100 µm, such that the sensing elements 11 can sense signals of the ridges 14 of the fingerprint 13.

However, when the protection layer 12 is made of glass and has a thickness of about 50 µm to 100 µm, it may be broken due to an inappropriate press force of the finger. FIG. 2 is another local cross-sectional view of the typical fingerprint sensing region, in which the thickness of the protection layer 12 is increased to be 200 µm to 300 µm. In FIG. 2, dimensional relationships among individual elements are illustrated only for ease of understanding, but not to limit the actual scale. When the thickness of the protection layer 12 is getting increased, the distance d1 between the ridge 14 and the sensing element 11-1 is getting close to the distance d2 between the ridge 14 and the sensing element 11-2, i.e., d1≈d2, and thus the signals sensed by the sensing elements 11-1 and 11-2 are alike, resulting in that the fingerprint cannot be sensed accurately. Thus, the prior art encounters a tradeoff problem; i.e., the layer 12 may be easily broken when the thickness is decreased, and the fingerprint sensing cannot be performed accurately if thickness of the layer 12 is increased.

Accordingly, a direct approach to solve the problem is to adopt a sapphire as a material of the protection layer 12, so as to prevent the protection layer 12 from being broken due to an inappropriate force applied thereon. However, such a way relatively increases the cost.

In addition, the conventional flat display device is manufactured by thin film transistor (TFT) manufacturing process, and in-cell touch control elements are integrated into the display panel for simplifying the manufacturing process and reducing the manufacturing cost. However, the conventional capacitive fingerprint identification device is manufactured by integrated circuit (IC) manufacturing process. As a result, the capacitive fingerprint identification device is difficult to be integrated into the flat display device. Therefore, it is desirable to provide an improved display device with fingerprint identification and touch detection to mitigate and/or obviate the aforementioned problems.

SUMMARY OF THE INVENTION

The object of the present invention is to provide a display device with fingerprint identification and touch detection, which can form more than one macro sensing electrode block at different positions of a first thin-film-transistor-and-sensing-electrode layer, so as to perform fingerprint image detection and touch sensing. Because of having more than one macro sensing electrode block at different positions, the present invention is able to identify fingerprints of multiple fingers. As the first thin-film-transistor-and-sensing-electrode layer is disposed at a viewing area of the display device, the fingerprint image detection can be performed directly on the viewing area of the display device without having to occupy the space beyond the viewing area for performing the fingerprint image detection, and thus the display device is suitable for the narrow-border handheld device.

To achieve the object, there is provided a display device with fingerprint identification and touch detection, which comprises: a first substrate; a second substrate parallel to the first substrate; a display material layer configured between the first substrate and the second substrate; and a thin-film-transistor-and-sensing-electrode layer disposed at one surface of the first substrate facing the display material layer, the thin-film-transistor-and-sensing-electrode layer having a plurality of sensing electrodes for performing fingerprint identification sensing and touch sensing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
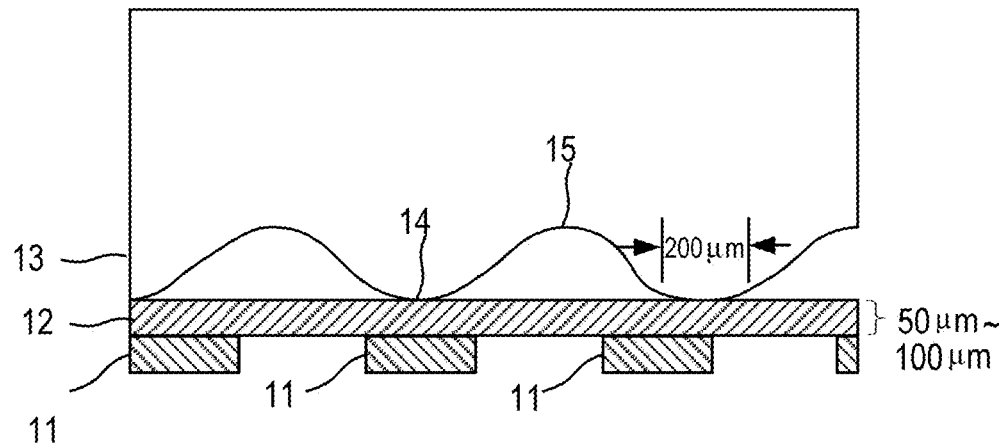
FIG. 1 is a local cross-sectional view of a typical fingerprint sensing region.
Figure 2:
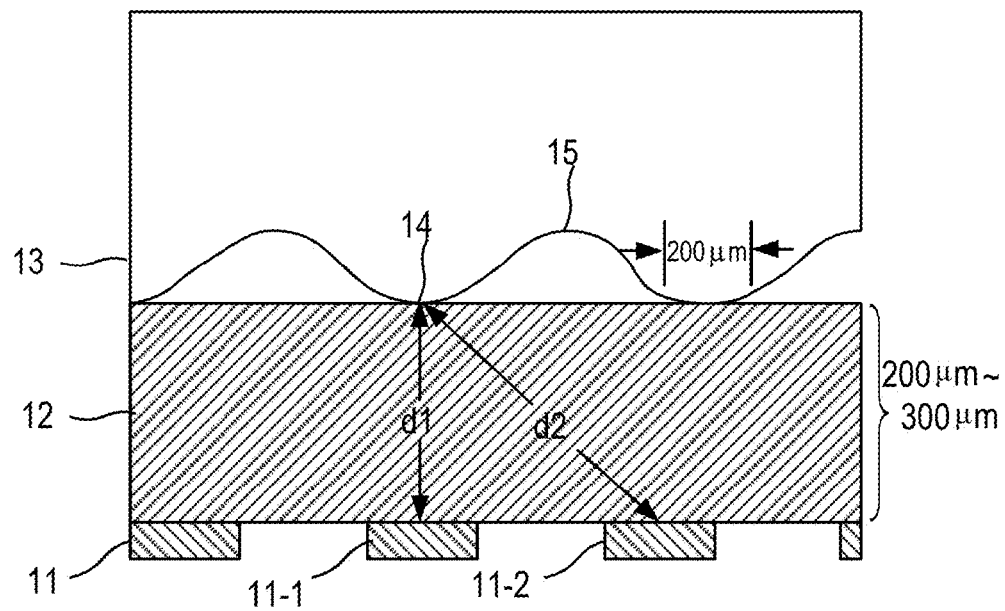
FIG. 2 is another local cross-sectional view of the typical fingerprint sensing region.
Figure 3:
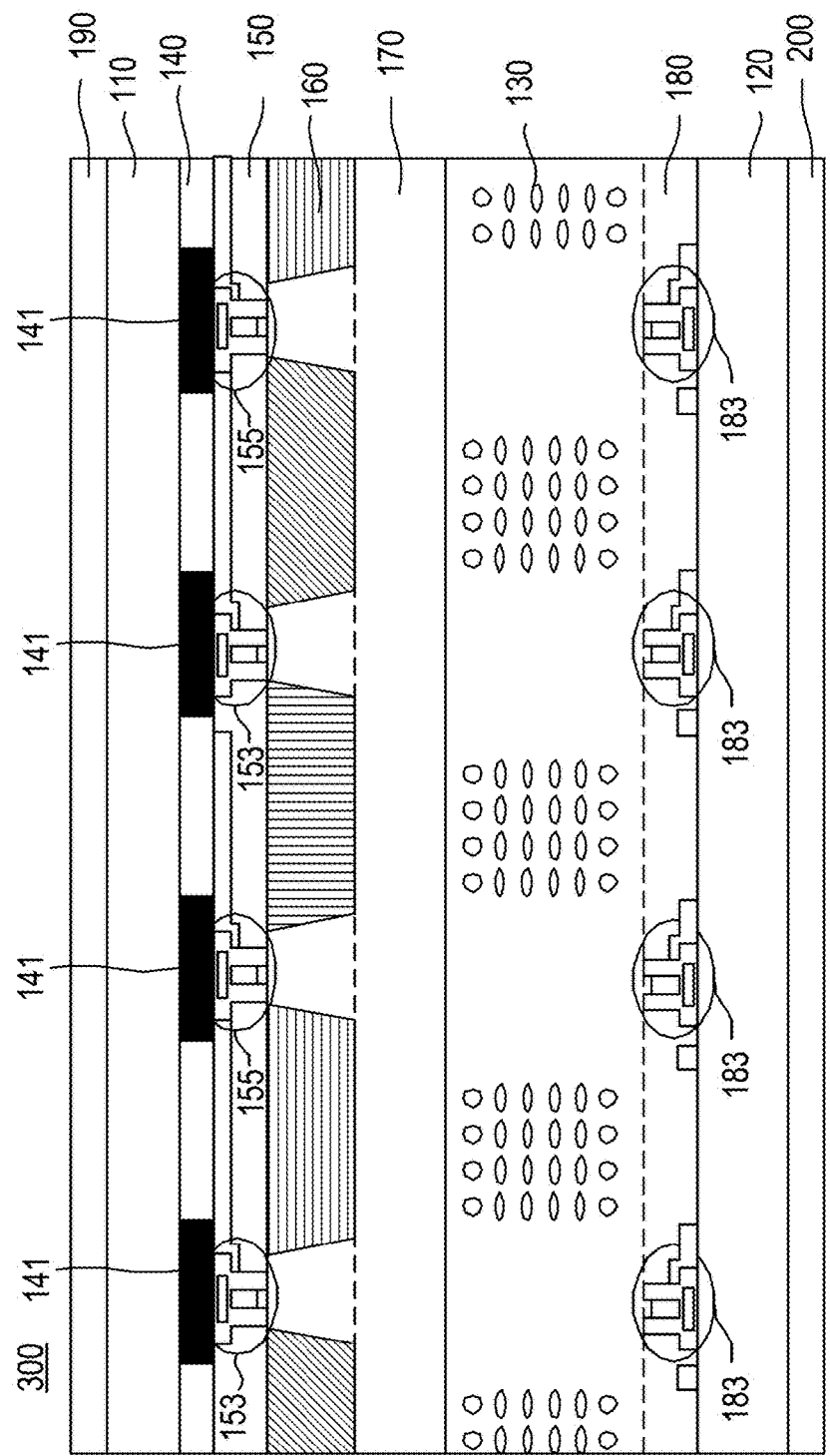
FIG. 3 is a stacked diagram of a display device with fingerprint identification and touch detection in accordance with a preferred embodiment of the present invention.

FIG. 3 is a stacked diagram of a display device with fingerprint identification and touch detection in accordance with a preferred embodiment of the present invention. As shown, the display device with fingerprint identification and touch detection 300 includes a first substrate 110, a second substrate 120, a display material layer 130, a first black matrix layer 140, a thin-film-transistor-and-sensing-electrode layer 150, a color filter layer 160, an over coat layer 170, a thin film transistor layer 180, a first polarizer layer 190, and a second polarizer layer 200.

The first substrate 110 and the second substrate 120 are preferably glass substrates and are parallel to each other. The display material layer 130 is disposed between the first and second substrates 110, 120. In this embodiment, the display material layer 130 is a liquid crystal layer.

The first black matrix layer 140 is between the first substrate 110 and the display material layer 130 and is disposed at one surface of the first substrate 110 that faces the display material layer 130. The first black matrix layer 140 is composed of a plurality of opaque lines.

Figure 4:
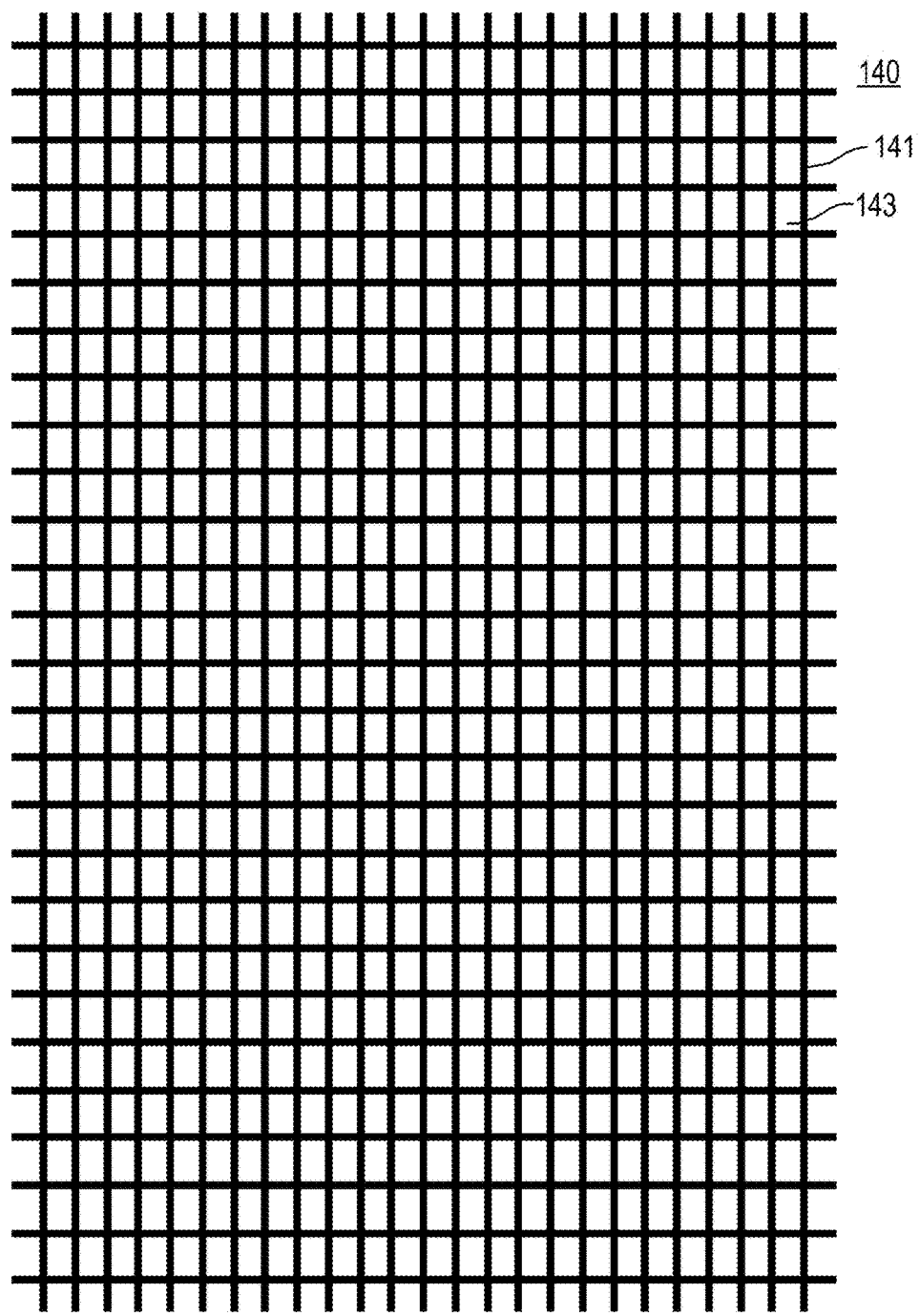
FIG. 4 shows the first black matrix layer in accordance with the present invention.

FIG. 4 shows the first black matrix layer 140, which is the same as that of the prior LCD panel. As shown in FIG. 4, the first black matrix layer 140 is composed of lines 141 of insulating material that are black and opaque. The lines 141 of black insulating material are arranged in a first direction and in a second direction perpendicular to the first direction for defining a plurality of light-penetrating blocks 143. The plurality of opaque lines 141 are disposed at positions corresponding to those of the gate lines and source lines of the thin film transistor layer 180. It is noted that the dimension and the arrangement of the opaque lines 141, as shown in FIG. 4, are for illustrative purpose only, but not in actual scale and ratio.

Figure 5:
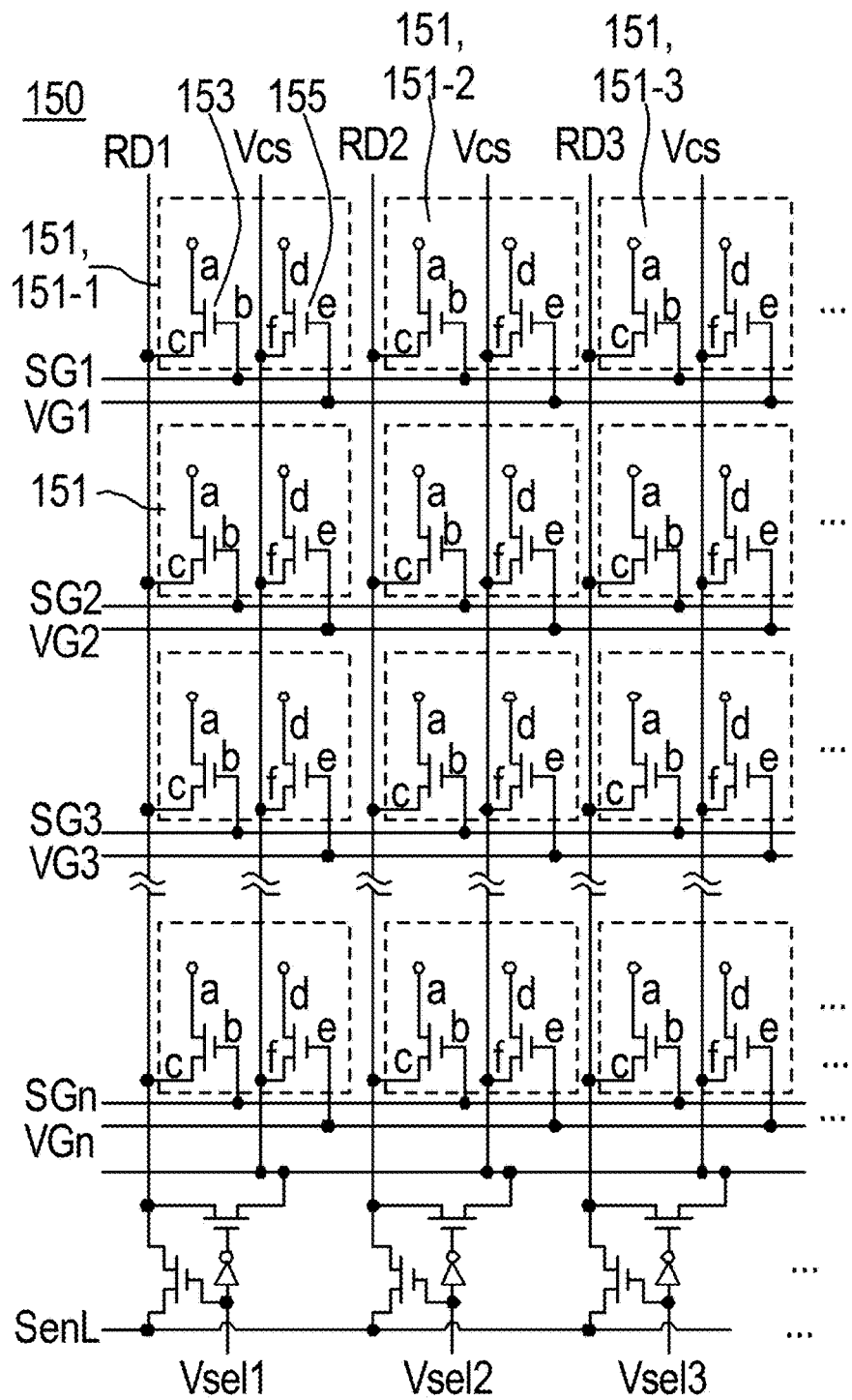
FIG. 5 is a schematic view of the thin-film-transistor-and-sensing-electrode layer in accordance with the present invention.

FIG. 5 is a schematic view of the thin-film-transistor-and-sensing-electrode layer 150 in accordance with the present invention. The thin-film-transistor-and-sensing-electrode layer 150 is disposed at one surface of the first black matrix layer 140 that faces the display material layer 130. The thin-film-transistor-and-sensing-electrode layer 150 has a plurality of sensing electrodes 151 for performing fingerprint identification sensing and touch sensing, wherein each sensing electrode 151 has a dimension substantially equal to an integer multiple of a pixel block (i.e., a light-penetrating block 143).

The thin-film-transistor-and-sensing-electrode layer 150 further includes a plurality of data readout selection elements 153, a plurality of common signal selection elements 155, a plurality of data readout selection lines SG1-SGn, a plurality of sensing signal readout lines RD1, RD2, RD3, . . . , and a plurality of common signal selection lines VG1-VGn.

Each of the data readout selection elements 153 corresponds to a sensing electrode 151. Each data readout selection element 153 has a first end (a), a second end (b) and a third end (c), wherein the first end (a) is electrically connected to the corresponding sensing electrode 151.

Each of the sensing electrodes 151 corresponds to at least a common signal selection element 155. Each common signal selection element 155 includes a first end (d), a second end (e) and a third end (f), wherein the first end (d) is connected to the corresponding sensing electrode 151.

Each of the data readout selection lines SG1-SGn is connected to the second end (b) of at least a corresponding data readout selection element 153.

Each of the sensing signal readout lines RD1, RD2, RD3, . . . is connected to the third end (c) of the at least a corresponding data readout selection element 153.

Each of the common signal selection lines VG1-VGn is connected to the second end (e) of at least a corresponding common signal selection element 155.

Each of the common signal lines Vcs is connected to the third end (f) of the at least a corresponding common signal selection element 155. By means of the data readout selection elements 153 and the common signal selection elements 155, the plurality of sensing electrodes are divided into at least a sensing area and at least a non-sensing area.

Each data readout selection element 153 is a first thin film transistor. Each common signal selection element 155 is a second thin film transistor. The first thin film transistor has a gate corresponding to the second end (b) of the data readout selection element 153, a source/drain corresponding to the first end (a) of the data readout selection element 153, and a drain/source corresponding to the third end (c) of the data readout selection element 153.

Each of the sensing electrodes 151 can be a polygon, circle, ellipse, rectangle, or square. Each sensing electrode 151 is made of material selected from the group consisting of: indium tin oxide (ITO), zinc tin oxide (ZTO), conductive polymer, nano silver, carbon nanotube, and graphene.

As shown in FIG. 5, the third end (f) of the common signal selection element 155 is connected to a common signal Vcs. In this embodiment, the common signal Vcs is preferred to be 0 volt. In other embodiments, the third end (f) of each common signal selection element 155 can be connected to different common signal, for example, common signal Vcs1, Vcs2, . . . , or Vcsn, wherein n is a positive integer and Vcs1, Vcs2, . . . , or Vcsn can be a constant voltage of specific level or a time-variable alternating voltage.

Figure 6:
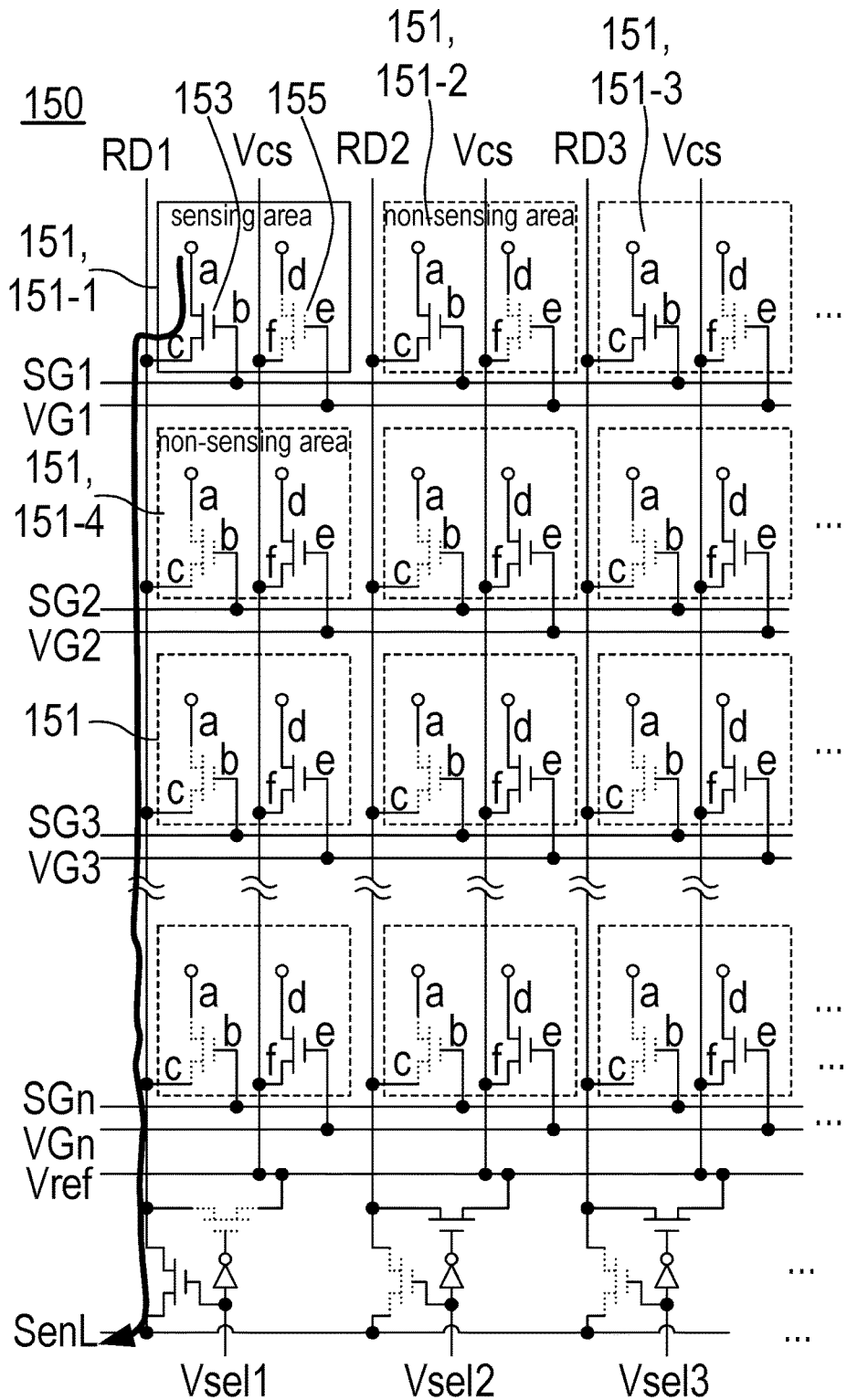
FIG. 6 shows an operation of the thin-film-transistor-and-sensing-electrode layer in accordance with the present invention.

FIG. 6 shows an operation of the thin-film-transistor-and-sensing-electrode layer 150 in accordance with the present invention, which illustrates how to accurately read sensing signal on the sensing electrode 151-1.

When performing self-capacitance sensing, the data readout selection line SG1 and a signal selection line Vsel1 are at high voltage level, the common signal selection lines VG2-VGn are at high voltage level, the data readout selection lines SG2-SGn are at low voltage level, the common signal selection line VG1 is at low voltage level, and the signal selection lines Vsel2, Vsel3, . . . are at low voltage level, whereby sensing signal of the sensing electrode 151-1 can be read out.

Because the data readout selection element 153 of the sensing electrode 151-2 is turned on, the voltage of the sensing electrode 151-2 is the common signal Vcs. Further, because the common signal selection element 155 of the sensing electrode 151-4 is turned on, the voltage of the sensing electrode 151-4 is the common signal Vcs. As a result, the sensing electrode 151-1 is provided with a shielding effect to prevent the sensing signal of the sensing electrode 151-1 from being interfered by noises FIG. 7 shows another operation of the thin-film-transistor-and-sensing-electrode layer 150 in accordance with the present invention, which illustrates how to accurately read sensing signal on both the sensing electrode 151-1 and sensing electrode 151-2.

When performing self-capacitance sensing, the data readout selection line SG1 and a signal selection line Vsel1 are at high voltage level, a signal selection line Vsel2 is at high voltage level, the common signal selection lines VG2-VGn are at high voltage level, the data readout selection lines SG2-SGn are at low voltage level, the common signal selection line VG1 is at low voltage level, and the signal selection lines Vsel3, Vsel4, . . . are at low voltage level, whereby sensing signals of the sensing electrode 151-1 and the sensing electrode 151-2 can be read out at the same time.

Because the data readout selection element 153 of the sensing electrode 151-3 is turned on, the voltage of the sensing electrode 151-3 is the common signal Vcs. Further, because the common signal selection elements 155 of the sensing electrode 151-4 and the sensing electrode 151-5 are turned on, the voltages of the sensing electrode 151-4 and the sensing electrode 151-5 are the common signal Vcs. As a result, the sensing electrode 151-1 and the sensing electrode 151-2 are provided with a shielding effect to prevent the sensing signals of the sensing electrode 151-1 and the sensing electrode 151-2 from being interfered by noises.

Figure 7:
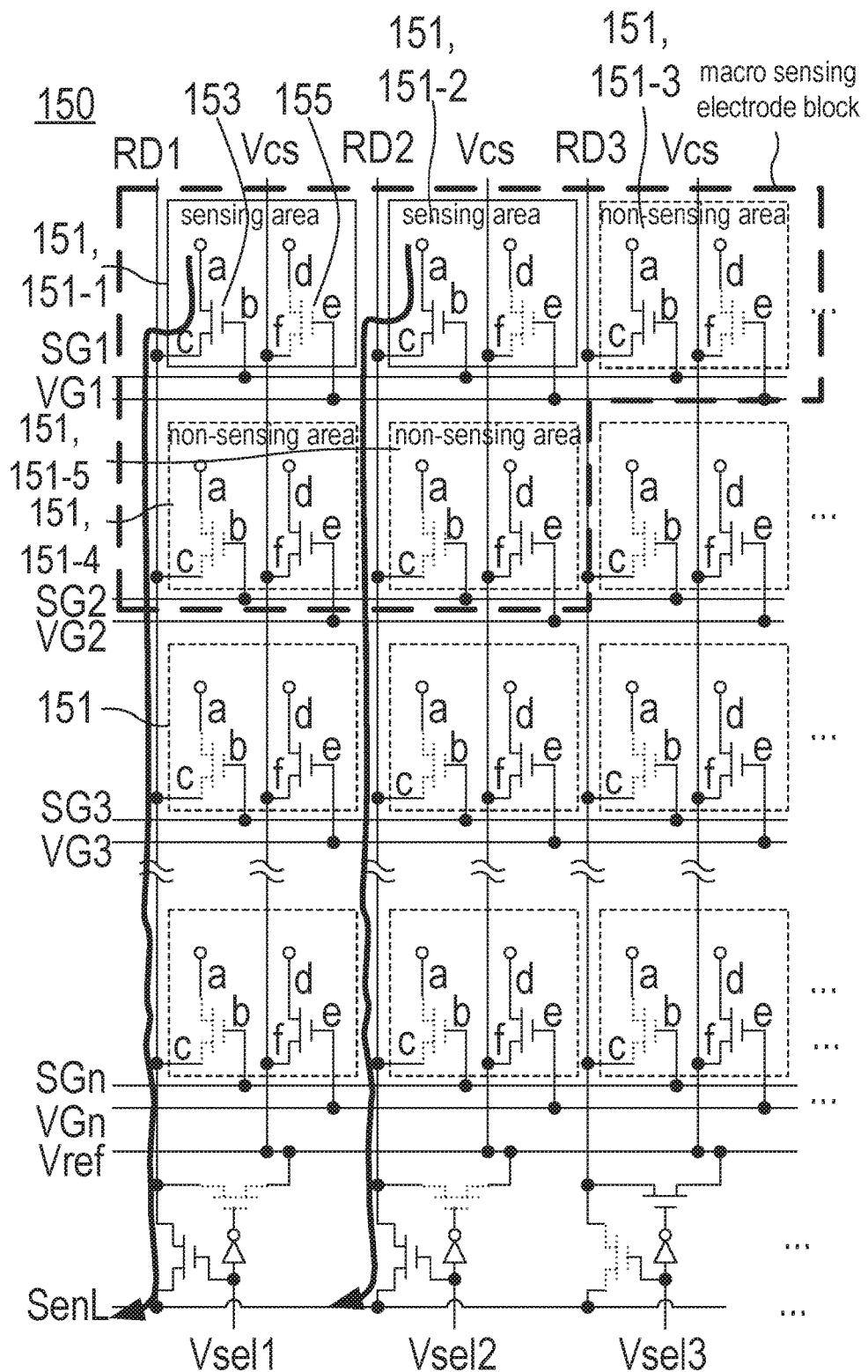
FIG. 7 shows another operation of the thin-film-transistor-and-sensing-electrode layer in accordance with the present invention.

As shown in FIG. 7, the present invention is able to combine multiple sensing electrodes 151 to form a macro sensing electrode block, wherein one macro sensing electrode block includes at least a sensing electrode 151. In other embodiments, the macro sensing electrode block may include two sensing electrodes 151, 3×5 sensing electrodes 151, or other different number of sensing electrodes 151. Furthermore, the data readout selection lines SG1-SGn, the signal selection lines Vsel1, Vsel2, Vsel3, . . . , the common signal selection lines VG1-VGn can be set in different manners to change the position of the macro sensing electrode block.

For the aforementioned setting, the thin-film-transistor-and-sensing-electrode layer 150 may have more than one macro sensing electrode block at different positions at the same time for simultaneously performing fingerprint image detection or touch sensing. Because of having more than one macro sensing electrode block at different positions, the present invention is able to identify fingerprints of multiple fingers.

Figure 8:
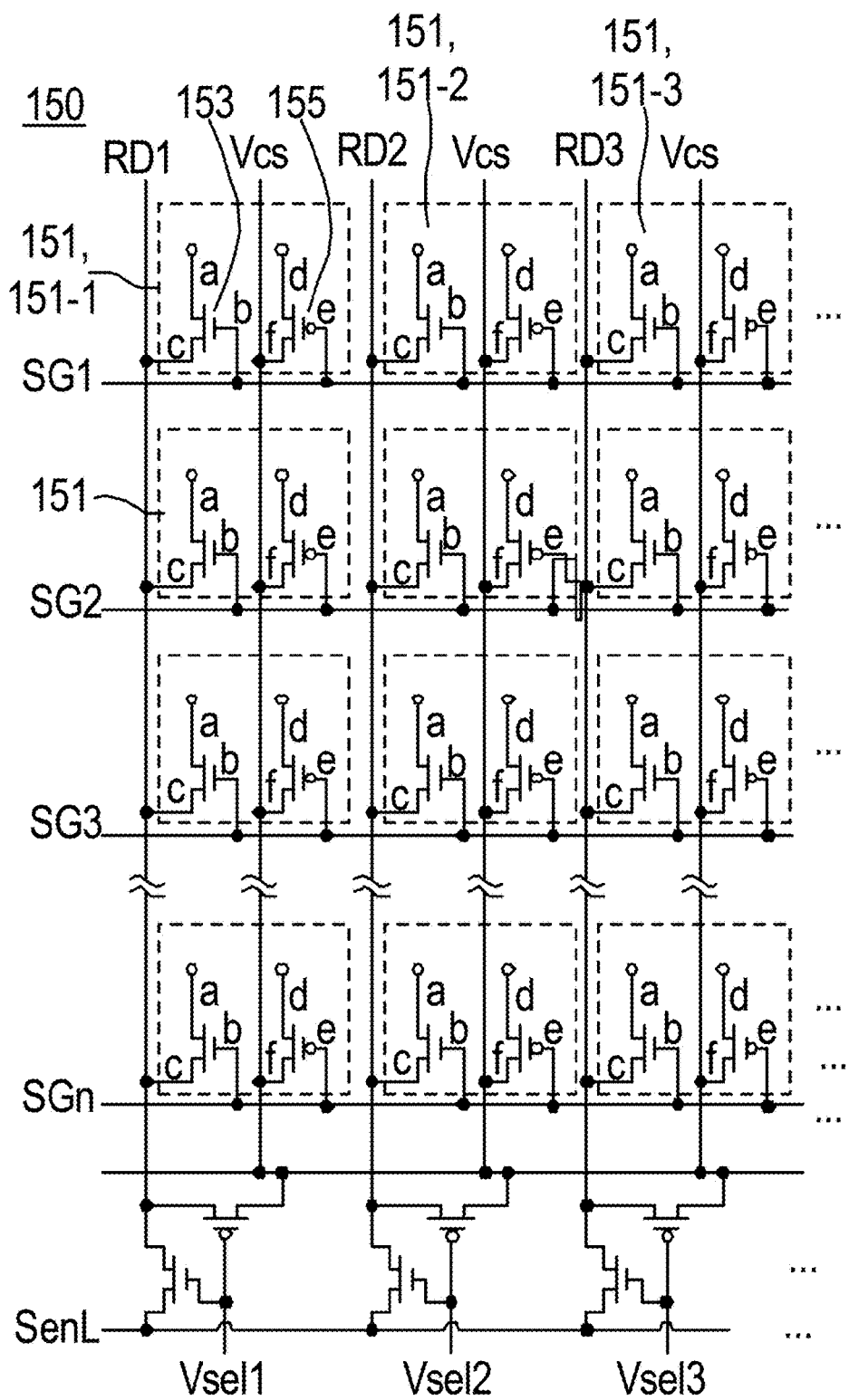
FIG. 8 is another schematic view of the thin-film-transistor-and-sensing-electrode layer in accordance with the present invention.

FIG. 8 is another schematic view of the thin-film-transistor-and-sensing-electrode layer 150 in accordance with the present invention, which is similar to that shown in FIG. 5 except that the common signal selection elements 155 are PMOS transistors. The operations therefor are the same as those shown in FIGS. 5-7 and thus a detailed description therefor is deemed unnecessary.

With reference to FIG. 3 again, the color filter layer 160 is disposed at one surface of the thin-film-transistor-and-sensing-electrode layer 150 that faces the display material layer 130. The over coat layer 170 is disposed at one surface of the color filter layer 160 that faces the display material layer 130.

Figure 9:
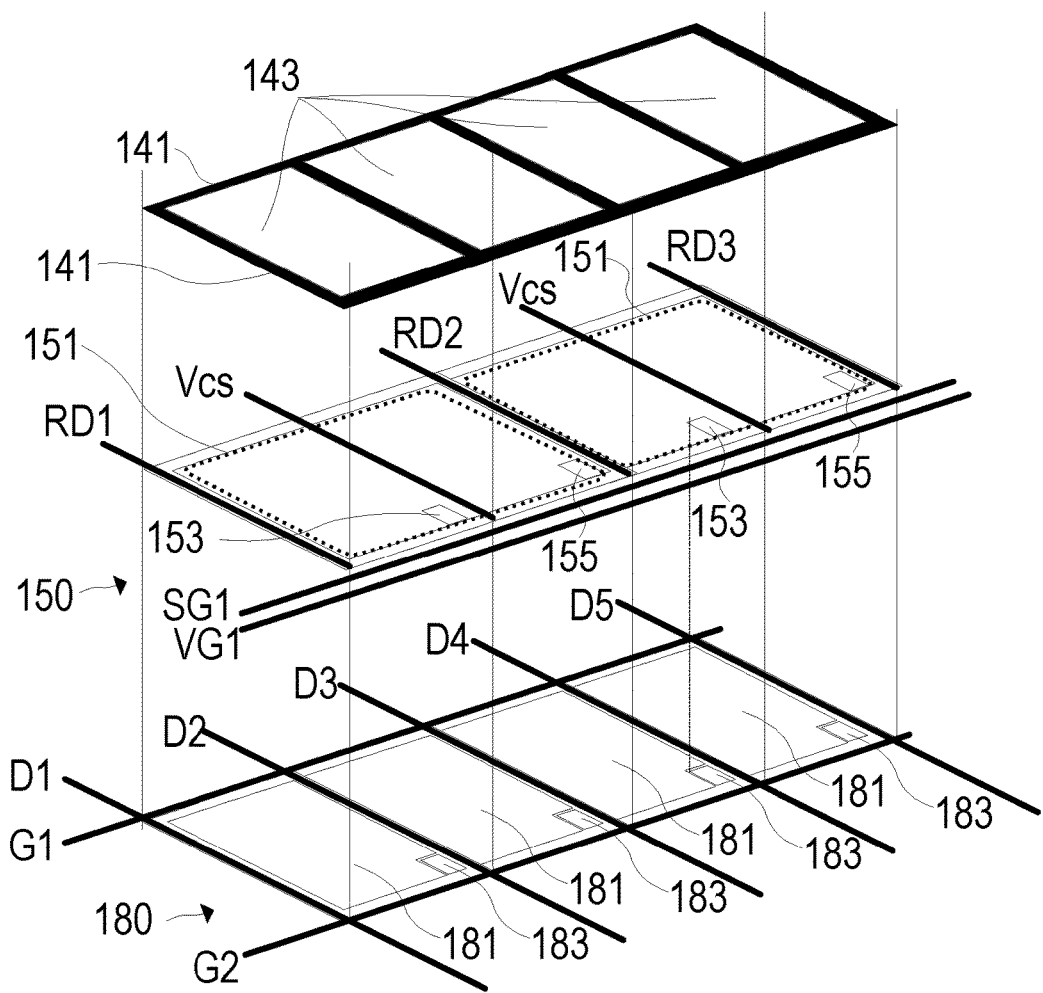
FIG. 9 schematically illustrates the sensing electrodes, the light-penetrating blocks and the pixel blocks.

With reference to FIG. 3 and FIG. 9, the thin film transistor layer 180 is disposed at one surface of the second substrate 120 that faces the display material layer 130. The thin film transistor layer 180 includes K gate lines (G1, G2, G3, . . . ) and L source lines (D1, D2, D3, . . . ), where K and L are each a positive integer. The K gate lines and the L source lines are arranged in the first direction and in the second direction, respectively, so as to define a plurality of pixel blocks 181. Each pixel block 181 includes a pixel transistor 183 and a pixel capacitor (not shown) corresponding thereto, so as to drive the corresponding pixel transistor 183 and pixel capacitor based on a display pixel signal and a display driving signal thereby performing a display operation. The data readout selection elements 153 and the common signal selection elements 155 are disposed at positions corresponding to those of the pixel transistors 183. The data readout selection lines SG1-SGn, the common signal selection lines VG1-VGn and the sensing signal readout lines RD1, RD2, RD3, . . . are disposed at positions corresponding to those of the K gate lines and the L source lines.

The K gate lines and the L source lines are disposed at positions corresponding to the plurality of opaque lines 141 of the first black matrix layer 140. That is, each pixel block 181 corresponds to a light-penetrating block 143.

FIG. 9 schematically illustrates the sensing electrodes 151, the light-penetrating blocks 143 and the pixel blocks 181. As shown, the size of one sensing electrode 151 is about that of two light-penetrating blocks 143; i.e., the size of one sensing electrode 151 is about that of two pixel blocks 181. In the present invention, the size of one sensing electrode 151 can be as small as that of one light-penetrating block 143. In other embodiments, the size of one light-penetrating electrode 151 can be about that of one light-penetrating block 143, two light-penetrating blocks 143, three light-penetrating blocks 143, etc.

Figure 10:
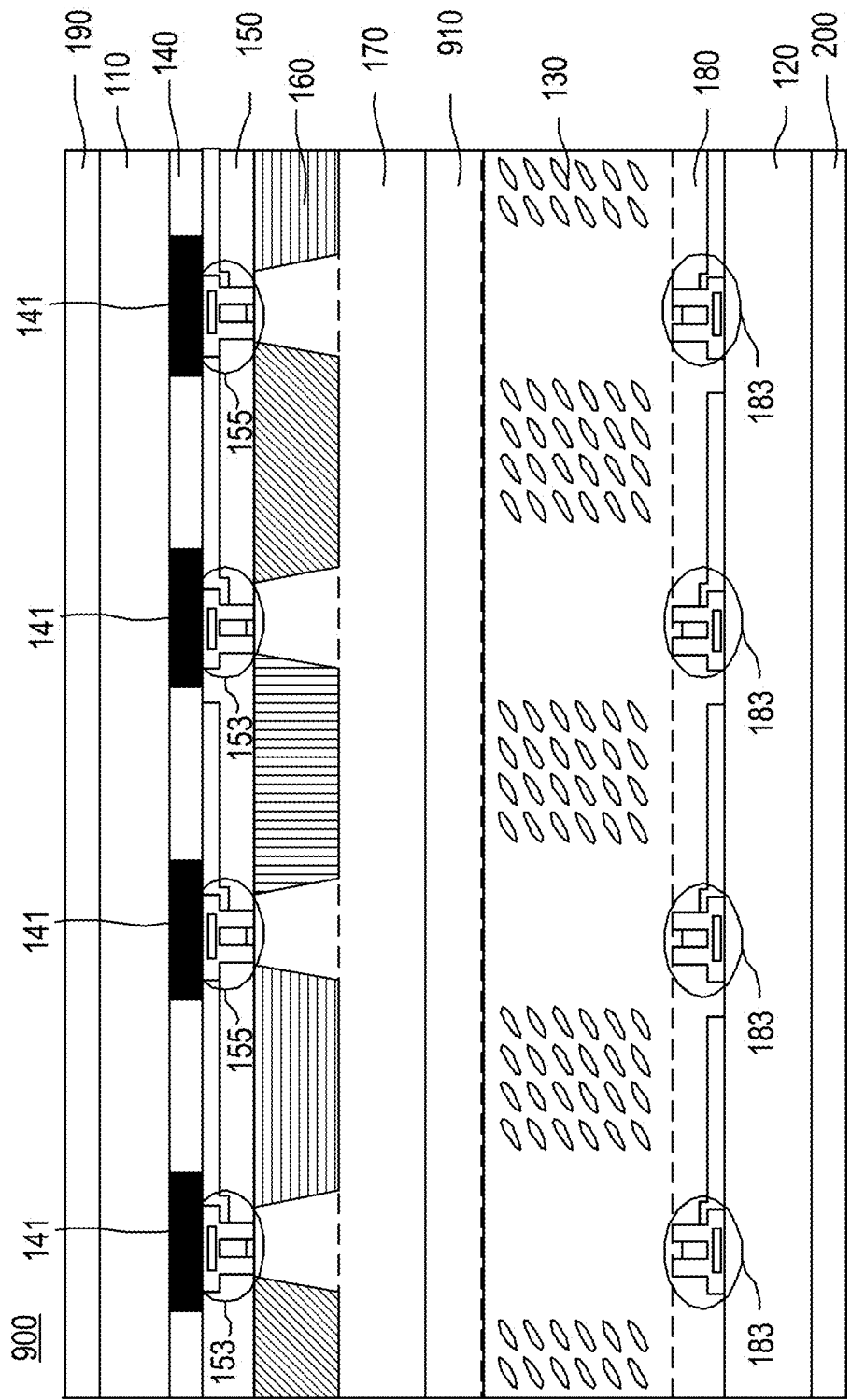
FIG. 10 is a stacked diagram of a display device with fingerprint identification and touch detection in accordance with another embodiment of the present invention.

FIG. 10 is a stacked diagram of a display device with fingerprint identification and touch detection in accordance with another embodiment of the present invention. As shown, the display device with fingerprint identification and touch detection 900 includes a first substrate 110, a second substrate 120, a display material layer 130, a first black matrix layer 140, a thin-film-transistor-and-sensing-electrode layer 150, a color filter layer 160, an over coat layer 170, a thin film transistor layer 180, a first polarizer layer 190, a second polarizer layer 200, and a transparent electrode layer 910. This embodiment is similar to that of FIG. 3 except that the transparent electrode layer 910 is inserted between the display material layer 130 and the over coat layer 170, which is suitable for VA type LCD panel.

Figure 11:
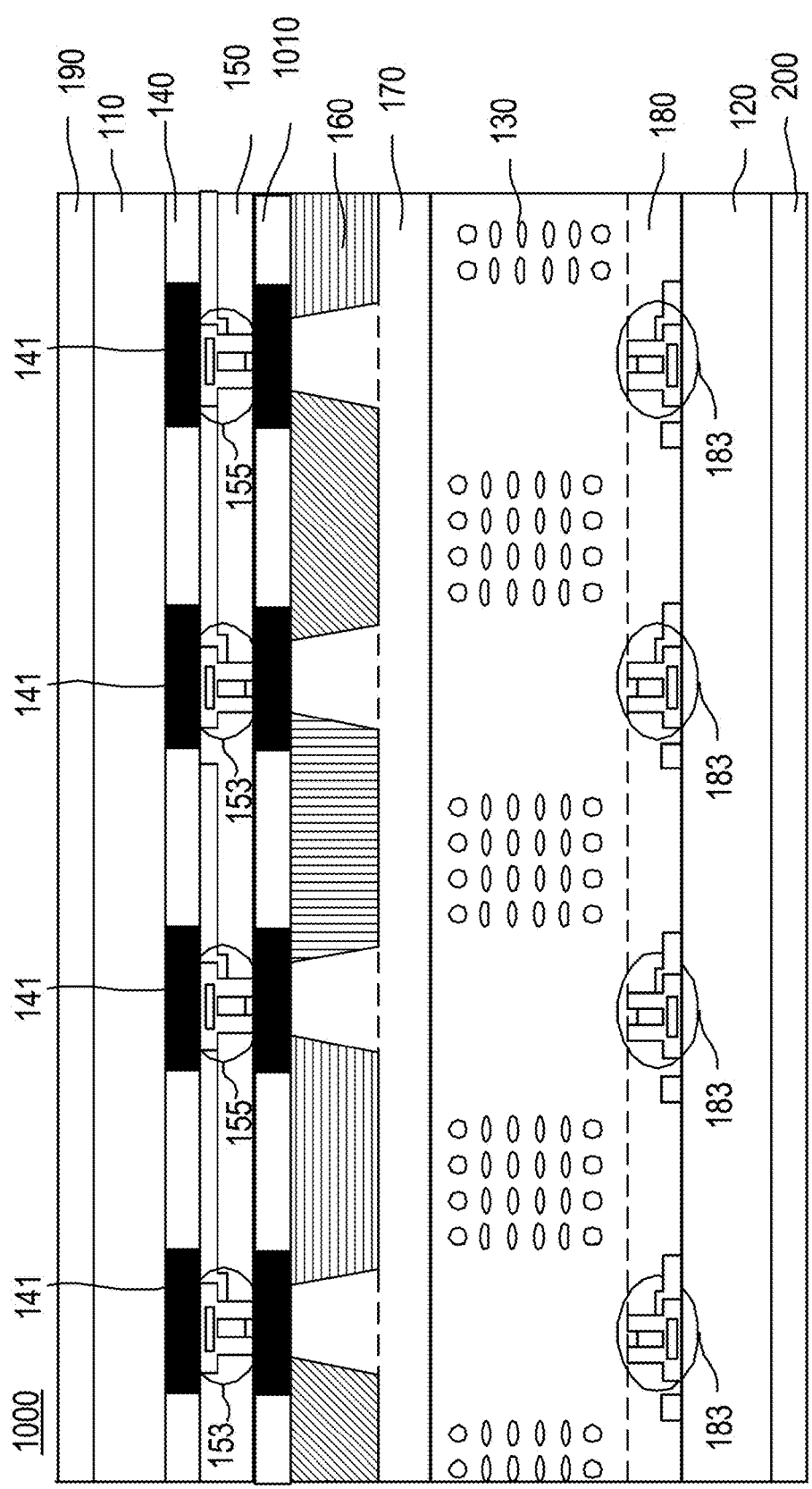
FIG. 11 is a stacked diagram of a display device with fingerprint identification and touch detection in accordance with still another embodiment of the present invention.

FIG. 11 is a stacked diagram of a display device with fingerprint identification and touch detection in accordance with still another embodiment of the present invention. As shown, the display device with fingerprint identification and touch detection 1000 includes a first substrate 110, a second substrate 120, a display material layer 130, a first black matrix layer 140, a thin-film-transistor-and-sensing-electrode layer 150, a color filter layer 160, an over coat layer 170, a thin film transistor layer 180, a first polarizer layer 190, a second polarizer layer 200, and a second black matrix layer 1010. This embodiment is similar to that of FIG. 3 except that the second black matrix layer 1010 is inserted between the thin-film-transistor-and-sensing-electrode layer 150 and the color filter layer 160. The second black matrix layer 1010 is composed of a plurality of opaque lines, which are disposed at positions corresponding to those of the opaque lines of the first black matrix layer 140.

Figure 12:
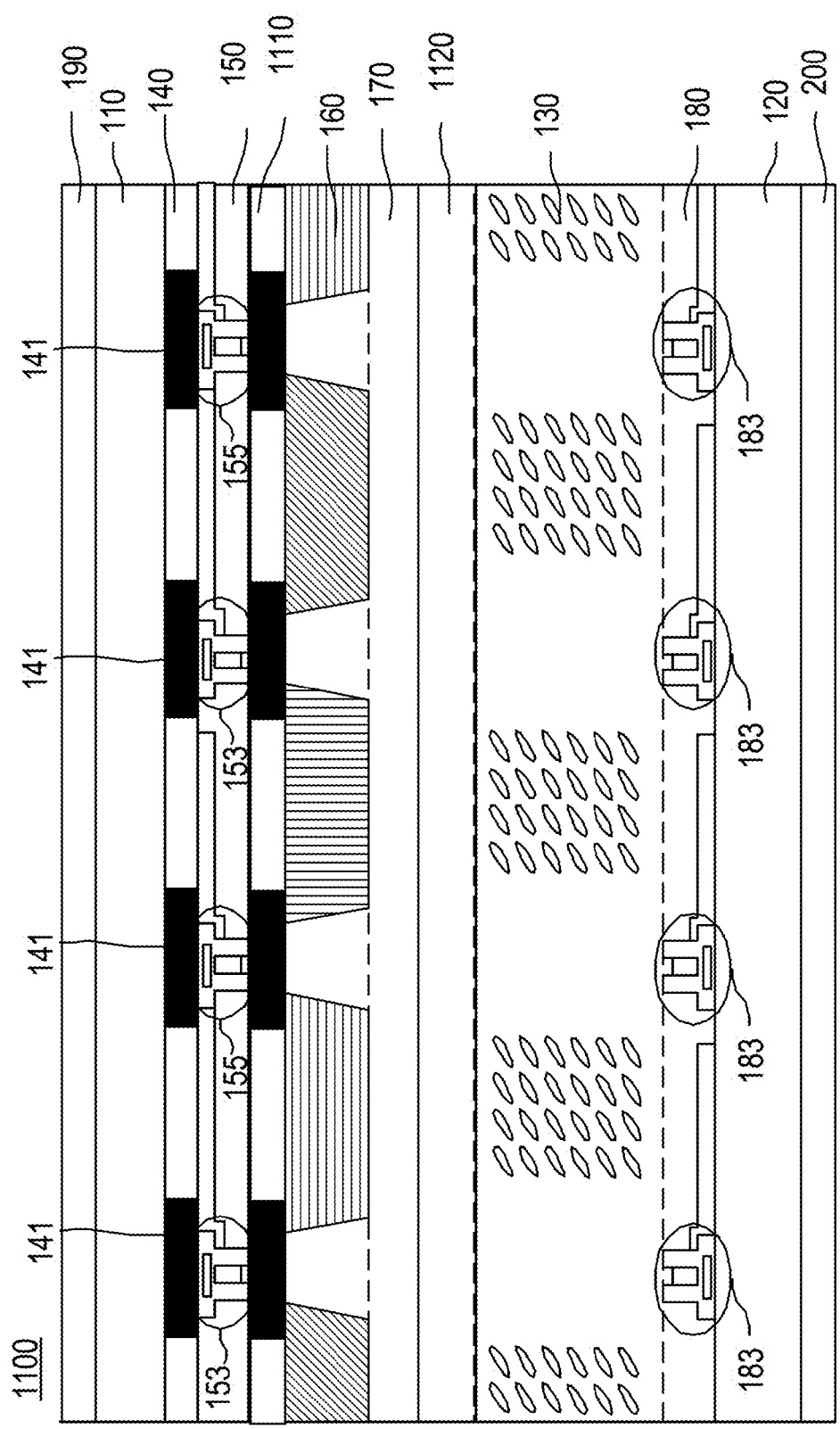
FIG. 12 is a stacked diagram of a display device with fingerprint identification and touch detection in accordance with yet another embodiment of the present invention.

FIG. 12 is a stacked diagram of a display device with fingerprint identification and touch detection in accordance with yet another embodiment of the present invention. As shown, the display device with fingerprint identification and touch detection 1100 includes a first substrate 110, a second substrate 120, a display material layer 130, a first black matrix layer 140, a thin-film-transistor-and-sensing-electrode layer 150, a color filter layer 160, an over coat layer 170, a thin film transistor layer 180, a first polarizer layer 190, a second polarizer layer 200, a second black matrix layer 1110, and a transparent electrode layer 1120. This embodiment is similar to that of FIG. 10 except that the second black matrix layer 1110 is inserted between the thin-film-transistor-and-sensing-electrode layer 150 and the color filter layer 160.

Figure 13:
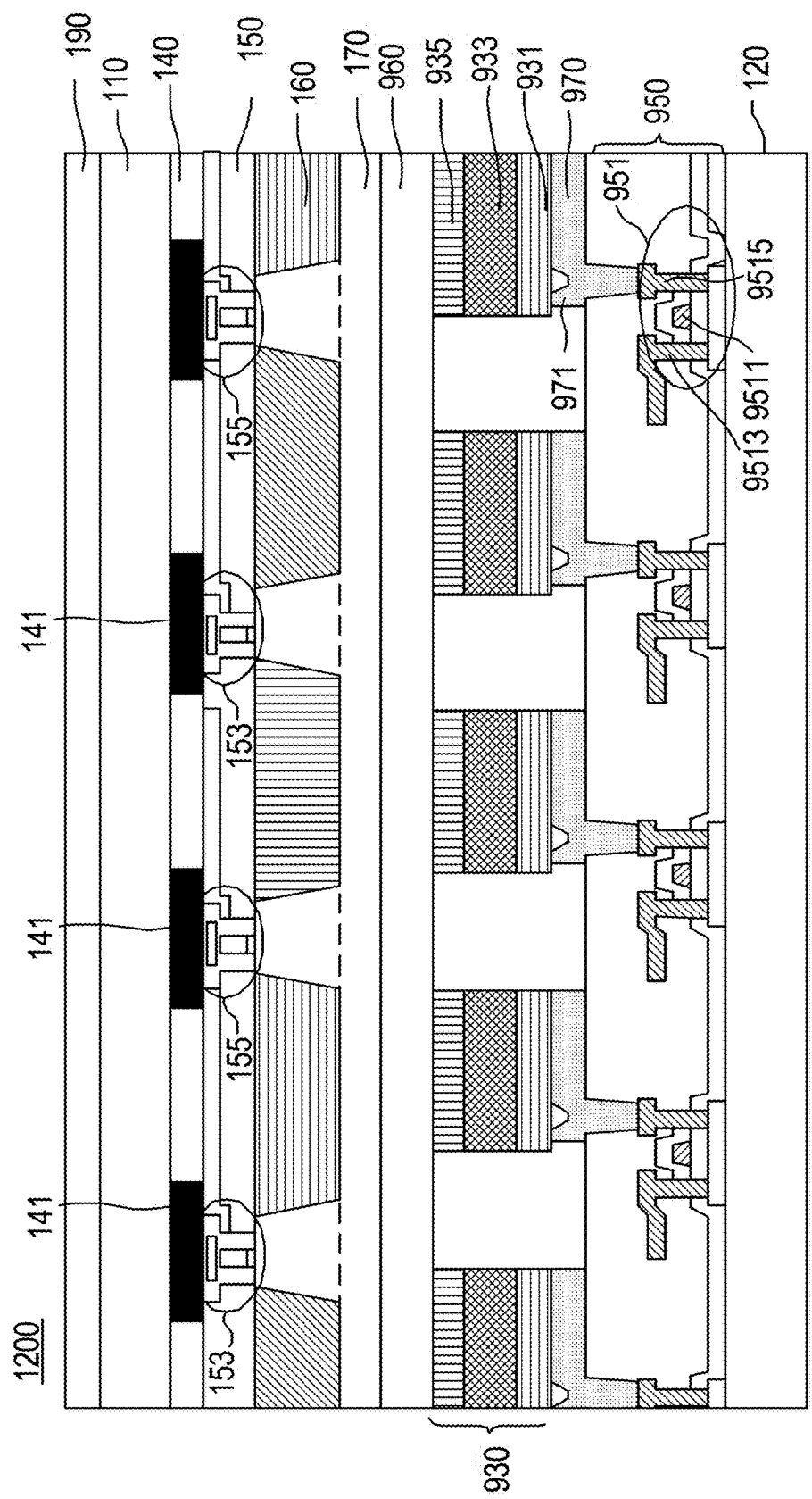
FIG. 13 is a stacked diagram of a display device with fingerprint identification and touch detection in accordance with further another embodiment of the present invention.

FIG. 13 is a stacked diagram of a display device with fingerprint identification and touch detection 1200 in accordance with further another embodiment of the present invention. This embodiment is similar to that of FIG. 3 except for the display material layer 930, the cathode layer 960, the anode layer 970, and the thin film transistor layer 950.

The first substrate 110 and the second substrate 120 are preferably glass substrates or plastic substrates and are parallel to each other. The display material layer 930 is disposed between the first and second substrates 110, 120, wherein the display material layer 930 is preferably an organic light emitting diode (OLED) layer.

The second thin film transistor layer 950 is disposed at one surface of the second substrate 120 that faces the display material layer 930. The second thin film transistor layer 950 includes a plurality of gate lines (not shown), a plurality of source lines (not shown), and a plurality of pixel driving circuits 951, each corresponding to a pixel, so as to drive a corresponding pixel driving circuit 951 based on a display pixel signal and a display driving signal thereby performing a display operation. The gate lines and the source lines are well-known to those skilled in the art and thus they are not shown in the figure. The gate lines and the source lines are arranged in the first direction and in the second direction, respectively, so as to define a plurality of pixel areas, each corresponding to a light-penetrating block 143.

According to different designs of the pixel driving circuit 951, such as 2T1C being a pixel driving circuit formed with two thin film transistors and a storage capacitor, and 6T2C being a pixel driving circuit formed with six thin film transistors and two storage capacitors, the gate 9511 of at least one thin film transistor in the pixel driving circuit 951 is connected to a gate line (not shown). According to different designs of driving circuit, a drain/source 9513 of at least one thin film transistor in a control circuit is connected to a source line (not shown) and a source/drain 9515 of at least one thin film transistor in pixel driving circuit 951 is connected to a corresponding anode pixel electrode 971 of the anode layer 970.

The cathode layer 960 is disposed at one side of the first substrate 110 that faces the display material layer 930 and between the first substrate 110 and the display material layer 930. The cathode layer 960 is formed with metal material, preferably metal material with thickness being less than 50 nm. The metal material is selectively to be alloy of aluminum, silver, magnesium, calcium, potassium, lithium, indium, and alloy thereof, or mixture of lithium fluoride, magnesium fluoride, lithium oxide and aluminum. Due to the thickness of the cathode layer 960 being less than 50 nm, the light generated by the display material layer 930 can pass through the cathode layer 960, so as to show images on the upper substrate 110. The cathode layer 960 is intact piece electrical connection, so that it can be used as a shielding. Moreover, the cathode layer 960 also receives the current coining from the anode pixel electrode 971.

The anode layer 970 is disposed at one surface of the second thin film transistor layer 950 that faces the display material layer 930. The anode layer 970 includes a plurality of anode pixel electrodes 971. Each of the anode pixel electrodes 971 corresponds to one pixel driving transistor of the pixel driving circuit 951 of the second thin film transistor layer 950. That is, each of the anode pixel electrodes is connected to a source/drain of the pixel driving transistor of the corresponding pixel driving circuit 951, so as to form a pixel electrode of a specific color, for example a red pixel electrode, a green pixel electrode, or a blue pixel electrode.

The display material layer 930 includes a hole transporting layer 931, an emitting layer 933, and an electron transporting layer 935. The display material layer 930 preferably emits white light, and uses the color filter layer 160 to filter out and to generate red, blue and green primary colors.

Figure 14:
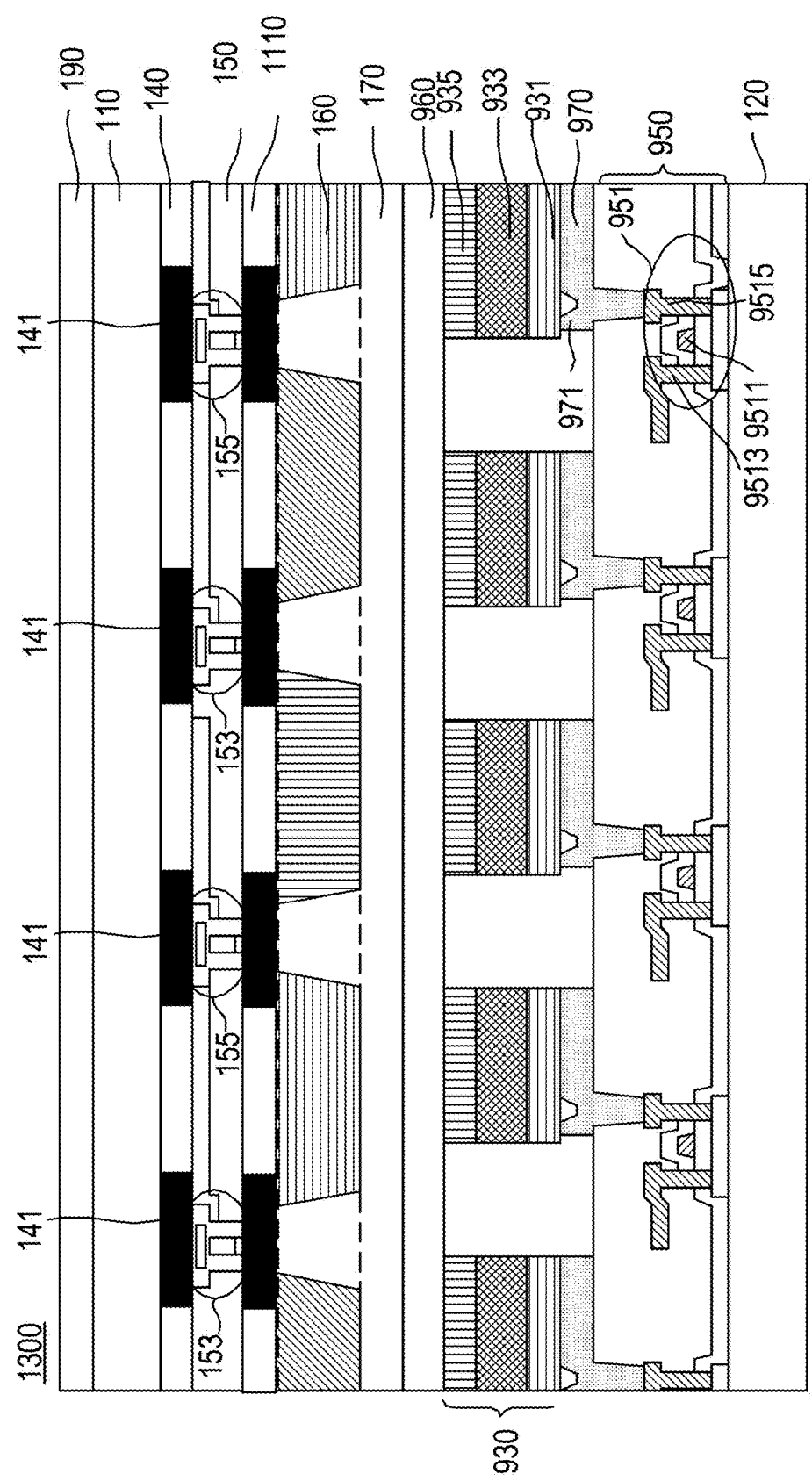
FIG. 14 is a stacked diagram of a display device with fingerprint identification and touch detection in accordance with still yet another embodiment of the present invention.

FIG. 14 is a stacked diagram of a display device with fingerprint identification and touch detection 1300 in accordance with still yet another embodiment of the present invention. This embodiment is similar to that of FIG. 13 except that, in FIG. 14, there is a second black matrix layer 1110 disposed between the thin-film-transistor-and-sensing-electrode layer 150 and the color filter layer 160.

Figure 15:
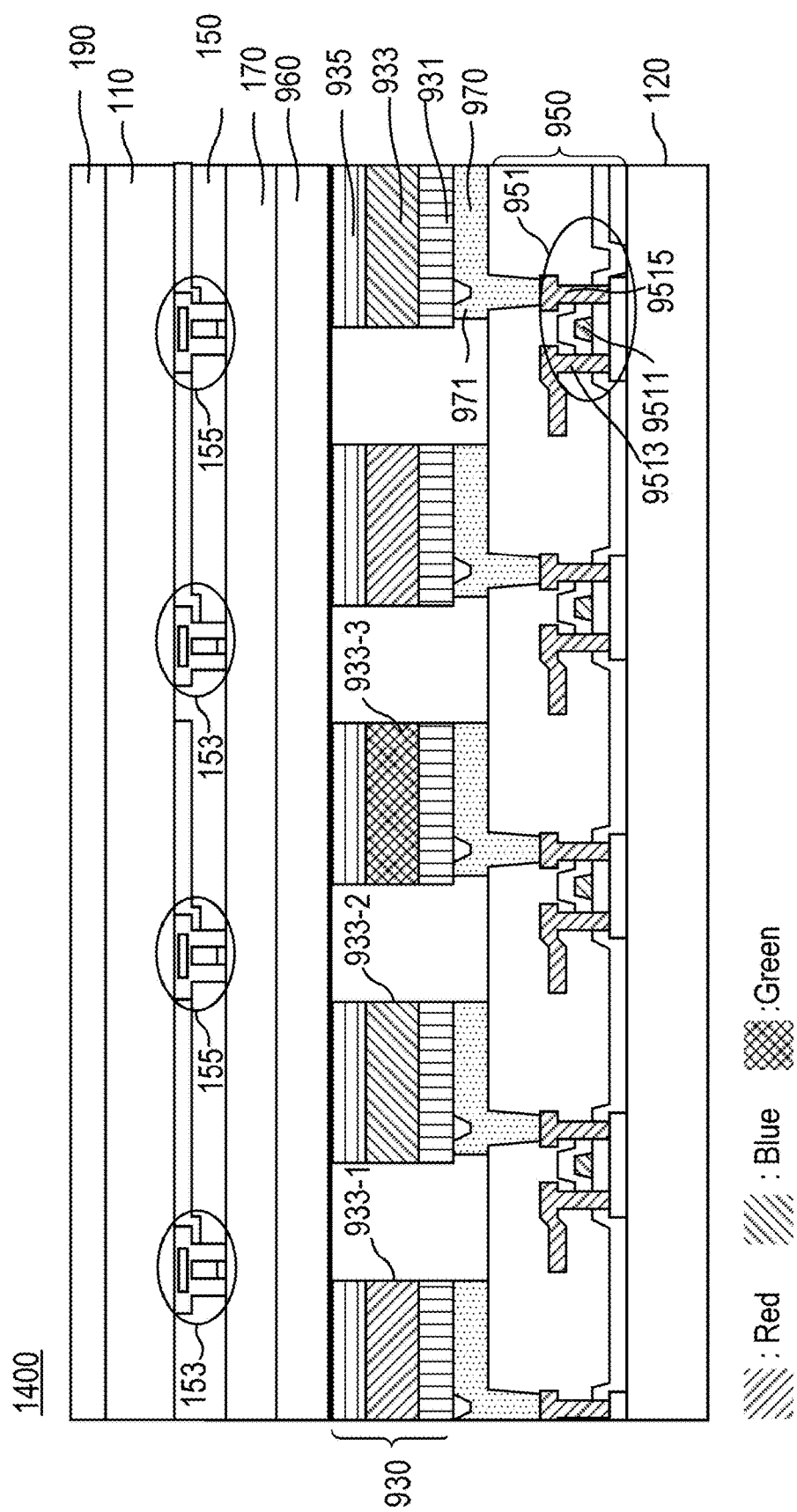
FIG. 15 is a stacked diagram of a display device with fingerprint identification and touch detection in accordance with still further another embodiment of the present invention.

FIG. 15 is a stacked diagram of a display device with fingerprint identification and touch detection 1400 in accordance with still further another embodiment of the present invention. This embodiment is similar to that of FIG. 13 except that, there are a red light emitting layer 933-1, a blue light emitting layer 933-2 and a green light emitting layer 933-3 used in FIG. 15, and thus there is no need to use a color filter layer.

In view of the forgoing, it is known that the present invention is able to form more than one macro sensing electrode block at different positions of the thin-film-transistor-and-sensing-electrode layer 150 for simultaneously performing fingerprint image detection and touch sensing. Furthermore, because of having more than one macro sensing electrode block at different positions, the present invention is able to identify fingerprints of multiple fingers at the same time. In addition, because the thin-film-transistor-and-sensing-electrode layer 150 is disposed at the viewing area of a display device, the fingerprint image detection can be performed directly on the viewing area of the display device. As a result, there is no need to occupy the space of the non-viewing area for fingerprint image detection, which is particularly suitable for narrow-border handheld device.

Although the present invention has been explained in relation to its preferred embodiment, it is to be understood that many other possible modifications and variations can be made without departing from the spirit and scope of the invention as hereinafter claimed.

What is claimed is:

1. A display device with fingerprint identification and touch detection, comprising:
   a first substrate;
   a first polarizer layer on the first substrate;
   a second substrate parallel to the first substrate;
   a display material layer configured between the first substrate and the second substrate;
   a thin-film-transistor-and-sensing-electrode layer disposed at one surface of the first substrate facing the display material layer, the thin-film-transistor-and-sensing-electrode layer having a plurality of sensing electrodes for performing fingerprint identification sensing and touch sensing; and
   an over coat layer disposed between the thin-film-transistor-and-sensing-electrode layer and the display material layer;
   wherein the thin-film-transistor-and-sensing-electrode layer includes:
   a plurality of data readout selection elements, each corresponding to a sensing electrode and having a first end electrically connected to the corresponding sensing electrode, a second end, and a third end;
   a plurality of common signal selection elements, wherein each sensing electrode corresponds to at least one common signal selection element, and each common signal selection element has a first end connected to the corresponding sensing electrode, a second end, and a third end;
   a plurality of data readout selection lines, each connected to the second end of at least one corresponding data readout selection element;
   a plurality of sensing signal readout lines, each connected to the third end of the at least one corresponding data readout selection element; and
   a plurality of common signal selection lines, each connected to the second end of at least one corresponding common signal selection element;
   wherein the plurality of sensing electrodes are divided into at least one sensing area and at least one non-sensing area so as to form one macro sensing electrode block by means of the plurality of data readout selection elements and the plurality of common signal selection elements;
   the sensing electrodes of a non-sensing area which are applied with common signal provide a shielding effect to prevent the sensing signals of the sensing electrodes of a sensing area from being interfered by noises; and
   the thin-film-transistor-and-sensing-electrode layer has more than one macro sensing electrode block at different positions at the same time for simultaneously performing fingerprint image detection or touch sensing.

2. The display device with fingerprint identification and touch detection as claimed in claim 1, wherein each data readout selection element is a first thin film transistor and each common signal selection element is a second thin film transistor.

3. The display device with fingerprint identification and touch detection as claimed in claim 2, wherein the first thin film transistor has a gate corresponding to the second end of the data readout selection element, a source/drain corresponding to the first end of the data readout selection element, and a drain/source corresponding to the third end of the data readout selection element.

4. The display device with fingerprint identification and touch detection as claimed in claim 3, wherein each of the sensing electrodes is selectively to be a polygon, circle, ellipse, rectangle, or square.

5. The display device with fingerprint identification and touch detection as claimed in claim 4, wherein each of the sensing electrodes is made of material selected from the group consisting of: indium tin oxide, zinc tin oxide, conductive polymer, nano silver, carbon nanotube, and graphene.

6. The display device with fingerprint identification and touch detection as claimed in claim 1, further comprising:
   a thin film transistor layer disposed at one surface of the second substrate facing the display material layer and including K gate lines and L source lines, where K and L are each a positive integer, the K gate lines and the L source lines being arranged in a first direction and in the second direction, respectively, so as to define a plurality of pixel blocks, each pixel block including a pixel transistor and a pixel capacitor corresponding thereto, so as to drive the corresponding pixel transistor and pixel capacitor based on a display pixel signal and a display driving signal thereby performing a display operation.

7. The display device with fingerprint identification and touch detection as claimed in claim 6, wherein each sensing electrode of the thin-film-transistor-and-sensing-electrode layer has a size that is N times of the pixel block, where N is a positive integer.

8. The display device with fingerprint identification and touch detection as claimed in claim 7, further comprising:
   a first black matrix layer disposed between the first substrate and the thin-film-transistor-and-sensing-electrode layer, the first black matrix layer being composed of a plurality of opaque lines arranged in the first direction and in the second direction for defining a plurality of light-penetrating blocks, the plurality of opaque lines being disposed above the gate lines and the source lines of the thin film transistor layer; and
   a color filter layer disposed at one surface of thin-film-transistor-and-sensing-electrode layer facing the display material layer.

9. The display device with fingerprint identification and touch detection as claimed in claim 8, further comprising:
   a transparent electrode layer disposed at one surface of the over coat layer facing the display material layer.

10. The display device with fingerprint identification and touch detection as claimed in claim 8, further comprising:
    a second black matrix layer disposed between the thin-film-transistor-and-sensing-electrode layer and the color filter layer, the second black matrix layer being composed of a plurality of opaque lines.

11. The fingerprint identification device as claimed in claim 6, wherein the plurality of data readout selection elements and the plurality of common signal selection elements are disposed above the plurality of pixel transistors.

12. The fingerprint identification device as claimed in claim 6, wherein the plurality of data readout selection lines, the plurality of common signal selection lines, and the plurality of sensing signal readout lines are disposed above the K gate lines and the L source lines.

13. The fingerprint identification device as claimed in claim 10, wherein the plurality of opaque lines of the second black matrix layer are disposed above the plurality of opaque lines of the first black matrix layer.

14. The fingerprint identification device as claimed in claim 1, wherein the display material layer is a liquid crystal layer or an organic light emitting diode layer.

* * * * *